United States Patent
Pillion et al.

(10) Patent No.: US 7,249,628 B2
(45) Date of Patent: Jul. 31, 2007

(54) APPARATUS FOR CONDITIONING THE TEMPERATURE OF A FLUID

(75) Inventors: John E. Pillion, Brookline, NH (US); Jieh-Hwa Shyu, Andover, MA (US); Alicia Briggs LaForge, Staten Island, NY (US); Robert McLoughlin, Pelham, NH (US)

(73) Assignee: Entegris, Inc., Chaska, MN (US)

( * ) Notice: Subject to any disclaimer, the term of this patent is extended or adjusted under 35 U.S.C. 154(b) by 395 days.

(21) Appl. No.: 10/489,288

(22) PCT Filed: Sep. 26, 2002

(86) PCT No.: PCT/US02/30494

§ 371 (c)(1),
(2), (4) Date: Mar. 11, 2004

(87) PCT Pub. No.: WO03/029775

PCT Pub. Date: Apr. 10, 2003

(65) Prior Publication Data

US 2004/0251017 A1      Dec. 16, 2004

Related U.S. Application Data

(60) Provisional application No. 60/326,357, filed on Oct. 1, 2001.

(51) Int. Cl.
*G05D 23/00* (2006.01)
*F28D 7/02* (2006.01)

(52) U.S. Cl. ............... 165/289; 165/157; 165/163; 165/11.1; 29/890.03

(58) Field of Classification Search .......... 165/289, 165/157, 158, 163, 905, 11.1, 11.2; 29/890.03, 29/890.033, 890.037, 890.043, 890.052, 29/890.053

See application file for complete search history.

(56) References Cited

U.S. PATENT DOCUMENTS

| 2,847,166 | A |   | 8/1958  | Smith |
|---|---|---|---|---|
| 4,129,177 | A | * | 12/1978 | Adcock .................. 165/48.2 |
| 4,261,332 | A |   | 4/1981  | Stewart |
| 4,320,870 | A |   | 3/1982  | Manor |
| 4,333,789 | A |   | 6/1982  | McAlister |
| 4,411,307 | A |   | 10/1983 | Ecker |
| 4,790,372 | A |   | 12/1988 | Gemeinhardt et al. |
| 5,216,743 | A | * | 6/1993  | Seitz ..................... 392/490 |
| 5,572,885 | A |   | 11/1996 | Erickson |
| 6,001,291 | A |   | 12/1999 | Cesaroni |
| 6,024,842 | A |   | 2/2000  | King |
| 6,180,038 | B1 |  | 1/2001  | Cesaroni |
| 6,189,605 | B1 |  | 2/2001  | Lameris |

* cited by examiner

*Primary Examiner*—Ljiljana Ciric
(74) *Attorney, Agent, or Firm*—John E. Pillion; Timothy J. King

(57) ABSTRACT

This invention relates to an apparatus for conditioning the temperature of a fluid by utilizing a thermoplastic heat exchanger (50) comprised of a plurality of hollow tubes. The apparatus controls the temperature of a process fluid inside the heat exchanger (50) via a controller (46) by adjustment of a control valve (64) that regulates the flow of an exchange fluid. The apparatus can be used to maintain the temperature of a chemical bath (12) and also to prepare discreet dispensed volumes of temperature controlled liquid.

19 Claims, 8 Drawing Sheets

APPARATUS FOR CONDITIONING THE TEMPERATURE OF A FLUID

RELATED APPLICATIONS

This application claims priority to provisional application 60/326,357 and is related to copending application filed concurrently herewith as U.S. Ser. No. 60/326,234, filed Oct. 1, 2001 under Applicants' reference number 200100292PCT (formerly MYKP-620).

FIELD OF INVENTION

This invention relates to an apparatus for conditioning the temperature of a fluid by utilizing a thermoplastic heat exchange apparatus comprised of a plurality of hollow tubes. The apparatus controls the temperature of a process fluid inside the heat exchanger by adjustment of a control valve which regulates the flow of an exchange fluid The apparatus has a fast response, is compact, chemically inert, and can operate at elevated temperatures.

BACKGROUND

Heat exchangers have been used in medical, automotive, and industrial applications. Their efficiency and heat transfer capacity are determined by the thermal conductivity, flow distribution, and heat transfer surface area of the exchanger.

Examples of applications of heat exchanger use in semiconductor manufacturing where controlled heating of a liquid is often required include: sulfuric acid and hydrogen peroxide photoresist strip solutions, hot phosphoric acid baths for silicon nitride and aluminum metal etching, ammonium hydroxide and hydrogen peroxide SC1 cleaning solutions, hydrochloric acid and hydrogen peroxide SC2 cleaning solutions, hot deionized water rinses, and heated organic amine based photoresist strippers.

Heating of chemical mechanical planarization, CMP, liquids and abrasive slurries can also be performed to control removal rates. A chemical mechanical slurry typically comprises solid abrasive materials like alumina or silica abrasives, oxidizers like hydrogen peroxide, and either acids or bases such as hydrochloric acid or ammonium hydroxide.

In many semiconductor manufacturing steps liquids with accurately controlled temperature are dispensed onto substrates to form thin films. In these applications the temperature of the liquid has an effect on the uniformity and thickness of the final film.

Accurate and repeatable temperature conditioning of liquids such as spin on dielectrics, photoresists, antireflective coatings, and developers prior to dispense onto a stationary or spinning substrate requires heating or cooling of these liquids. This is often done by flowing the process liquid inside a relatively thick walled perfluorinated tube whose temperature is controlled on the outside of the tube with a flow of water.

Heat exchangers are devices which transfer energy between fluids. This is done by contacting one fluid, the process fluid, and a working fluid or exchange fluid. These two fluids are physically separated from each other by the walls the material comprising the heat exchanger. Polymer based heat exchangers are commonly used for heating and cooling chemicals for many these applications due to its chemical inertness, high purity, and resistance to corrosion. However polymeric heat exchange devices are usually large because a large heat transfer surface area is required to effect a given temperature change due to the low thermal conductivity of the polymers used in the device. Such a large size has not made it practical to use such devices on semiconductor process tools Gas to liquid finned heat exchangers are used in conditioning gases used in lasers. These exchangers are commonly made of metals which are not suitable for use with corrosive chemicals or gases and can produce particles when moisture is present.

U.S. Pat. No. 3,315,740 discloses a method of bonding tubes together by fusion for use in heat exchangers. Tubes of a thermoplastic material are gathered in a manner such that the end portions of the tubes are in a contacting parallel relationship. Canadian Patent 1252082 teaches the art of making spiral wound polymeric heat exchangers and U.S. Pat. No. 4,980,060 describes fusion bonded potting of porous hollow fiber tubes for filtration. Neither disclosure contemplates the use of temperature control of such devices.

U.S. Pat. No. 5,216,743 teaches the use of a plurality of thermoplastic compartments with individual heating elements in each compartment for heating water. Temperature sensors are in communication with a temperature controller to turn individual heating elements on or off to maintain the desired water temperature. The invention does not contemplate use in organic liquids, corrosive or oxidizing chemicals of high purity for which it would be unacceptable to use such heating elements. Similarly the thermoplastic compartments are relatively few in number.

U.S. Pat. No. 5,748,656 discloses the use of a metal heat-exchange system for controlling the temperature of a lasing gas in a laser system using a heat-exchanger, a temperature sensor, a microprocessor controller, and a proportioning valve to control the flow of heat exchange fluid as a way to control the temperature of the laser gas. While such an invention is useful for controlling the temperature of gases, such a heat exchange system would have limited use for controlling the temperature of liquids. This is because of the much higher heat capacity and mass of liquids compared to gases. In addition, the corrosive nature of many liquids would preclude their use by such a system. This invention does not contemplate use of the heat exchanger for dispensing of controlled temperature and volumes of liquids.

Currently it is impractical to use thermoplastic heat exchangers to control the temperature of fluids because of the high expense and large size of devices needed. Metal heat exchangers are generally unacceptable for use in semiconductor manufacturing because of the corrosive nature of the chemicals and also the need to eliminate metallic and particulate impurities from process liquids. What is needed is an apparatus for controlling and conditioning the temperature of dispensed liquid volumes or recirculating liquid systems. The system should have fast response to temperature change, be chemically inert, have high surface area, and minimal volume.

SUMMARY OF THE INVENTION

The present invention provides for a high surface area thermoplastic heat exchanger device coupled to a fluid flow circuit with a temperature sensor, fluid control valve, and a microprocessor controller. The apparatus is useful for conditioning the temperature of fluids used in recirculation baths and fluid dispense applications.

In a preferred practice of this invention, perfluorinated thermoplastic hollow tubes, fibers, or filaments are used in the heat exchanger of this invention. The filaments are made of polymers such as poly(tetrafluoroethylene-co-perfluoro (alkylvinylether)), poly(tetrafluoroethylene-cohexafluoropropylene), or blends thereof. The hollow tubes are fusion bonded to form a unitary end structure or a unified terminal end block with a perfluorinated thermoplastic resin and a housing. In this structure the hollow tubes are fluid tightly bonded to the thermoplastic resin.

In the preferred practice of the invention the hollow tubes contained in the housing are braided, plaited, or twisted to create cords of the hollow tubes, fibers, or filaments prior to fusion bonding. The cords are thermally annealed to set the crest or bend of the cords. A cord is referred to in the practice of this invention as one or more hollow tubes, fibers, or filaments which have been twisted, plaited, or braided, and laid parallel to form a unit which can be potted or alternately fusion bonded into the housing. Cords of thermally annealed hollow tubes gives the exchanger a high packing density, high heat transfer surface area, enhanced flow distribution, and a small volume. The heat exchange device is capable of operating with organic, corrosive, and oxidizing liquids at elevated temperatures. The heat exchanger has a housing with fluid inlet and outlet connections for the process and working fluids to be contacted across the walls of the hollow tubes. Contacting the fluids across the wall of the hollow tubes results in exchange of energy between the process and working fluids.

In a one embodiment of the apparatus the heat exchanger is coupled with a flow sensor, temperature sensor, and valve to enable dispense of controlled volumes of precisely temperature controlled liquids.

In a second embodiment the heat exchanger is placed in a fluid circuit with a temperature sensor and a valve and a microprocessor to control the temperature of a bath.

DESCRIPTION OF SPECIFIC EMBODIMENT

This invention relates to a heat exchanger apparatus composed of a plurality of thermoplastic heat exchange tubes potted into a thermoplastic material. The exchange apparatus is coupled with temperature sensors, control microprocessor, flow sensor, or optionally valves to control the temperature of a dispensed process fluid or chemical bath in real time. While the embodiments and examples of this invention are made with reference to water which is heated or cooled, it is to be understood that such illustrations are not limited to water as a fluid and heated solutions as a dispensed fluid. Other suitable fluids for heating and cooling include gases.

Figure 1:
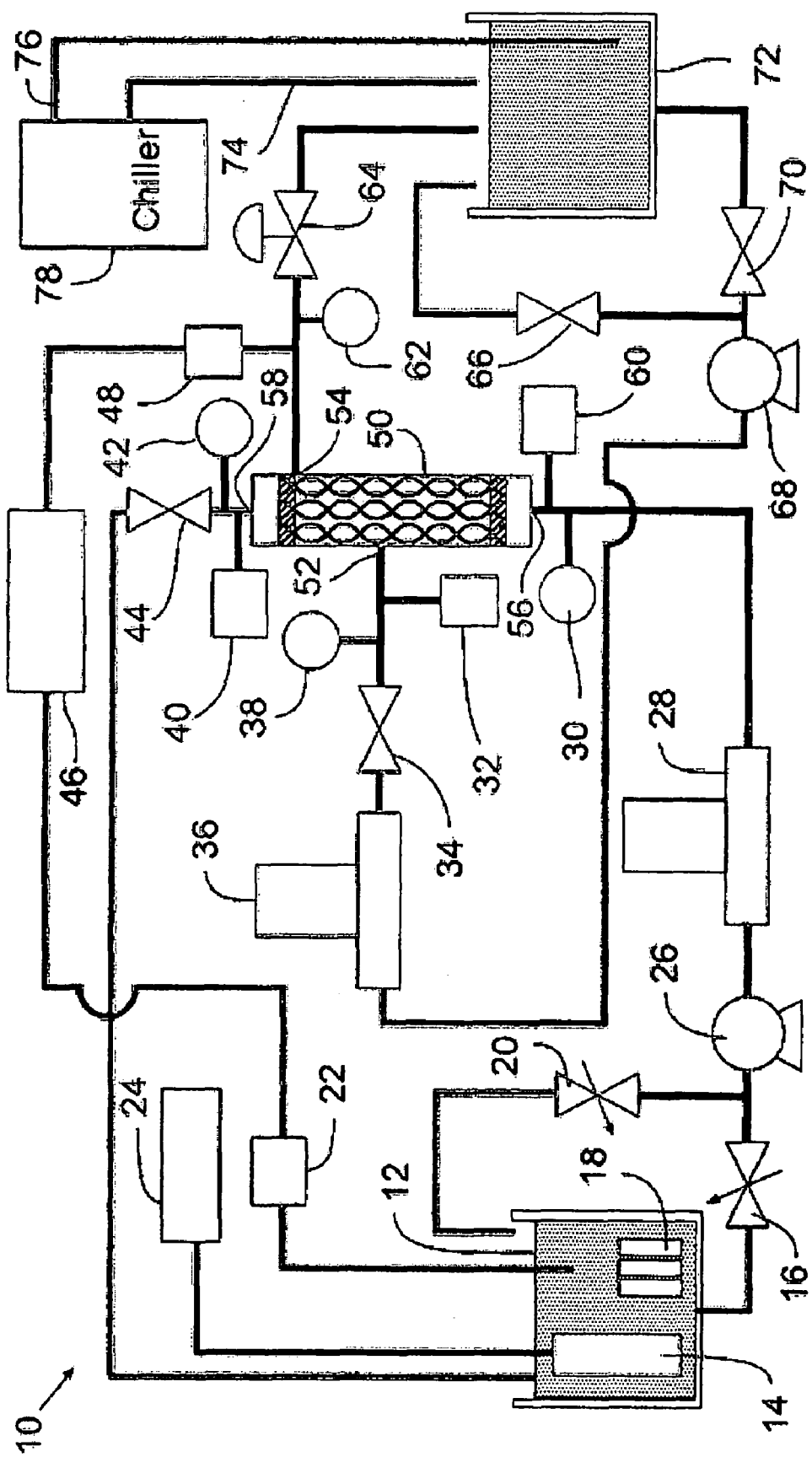
FIG. 1. is a schematic view illustrating the apparatus comprising a heat exchanger connected in-line with a fluid flow circuit, a temperature bath, and temperature control system of this invention to maintain the temperature of a bath.

A schematic diagram illustrating the apparatus of the invention is shown in FIG. 1. In this figure the flow of process fluid and working fluid are shown flowing in a co-current fashion, however the fluids may also be made to flow in a counter current fashion. In the practice of this invention the heat exchanger 50 and temperature controller 46 are used to control the temperature of a re-circulation bath 12. The bath 12 may be used to clean, strip, or coat substrates 18 as part of a semiconductor manufacturing process. A source of energy 24, for example megasonic or radiant energy, may be directed into the tank at through a probe or lamp housing 14. Liquid in the bath may be circulated through valve 16, pump 26, and optionally flow controller for flow meter 28. The liquid from the bath enters the heat exchanger 50 at inlet connection 56, and flow through the device where it exchanges energy with fluid in 72. The liquid from the bath leaves the exchanger at outlet 58, through optional valve 44, and is returned to the bath 12. Optional pressure transducers 30 and 42, and temperature sensors 40 and 60 may be connected to the fluid flow circuit conduit. A bypass containing valve 20 can be used to adjust flow of bath liquid through the exchange apparatus. The signal from a temperature sensor 22 passes to a microprocessor-based controller 46, for example a CN7600 temperature controller available from Omega Engineering, Stamford, Conn. Optional temperature sensor 48 measures the temperature of the fluid as it leaves the exchanger at outlet 54. The controller 46 continually monitors the change in the process fluid temperature from a desired set point and sends a signal to a valve 64 or a flow controller 36, or to the pump 68 to varies the flow of fluid 72 into the heat exchanger 50 and to maintain the temperature of the process fluid exiting the exchanger at process fluid outlet 58. The temperature of the fluid in 72 is conditioned by 78 through tubes 76 and 74. In this FIG. 78 is shown as a chiller, but could also be a fluid heater. The fluid in 72 can be recirculated through the exchange apparatus through valve 70 and by pump 68. The liquid from 72 flows through optional flow controller or flow meter 36. In the fluid conduit inlet to fluid port 52 optionally comprises valve 34, pressure transducer 38, and temperature sensor 32. Fluid from 72 exits the exchange apparatus at fluid port 54, and flow through the conduit with temperature sensor 48, pressure transducer 62, and proportioning valve 64. The fluid is returned back to 72. An optional bypass loop for 72 comprising valve 66 is useful for changing the flow of liquid from 72.

The proportioning valve 64 permits continuous adjustment of the flow of water into the heat exchanger. An on-off valve can also be used with the advantage that it is simpler to operate and can control higher pressures of fluid. The proportioning valve is preferably a quick acting valve and can be pneumatically actuated, voice coil actuated, or electrically actuated. Examples of such valves include SMC valves, Entegris Teflon pneumatic valves. Suitable fluid flow controllers 36 include gas mass flow controllers from Mykrolis Corporation, Billerica, Mass.; and liquid flow controllers from NT International, Chaska, Minn. A variable speed liquid pump useful in the practice of this invention is available from Cole-Parmer Instrument Company, Vernon Hills, Ill.

The temperature-sensing devices 22 and 48 are preferably resistive temperature devices or thermocouples available from Omega Engineering, Stamford, Conn. Alternatively thermistors can be used to measure the temperature.

Figure 2:
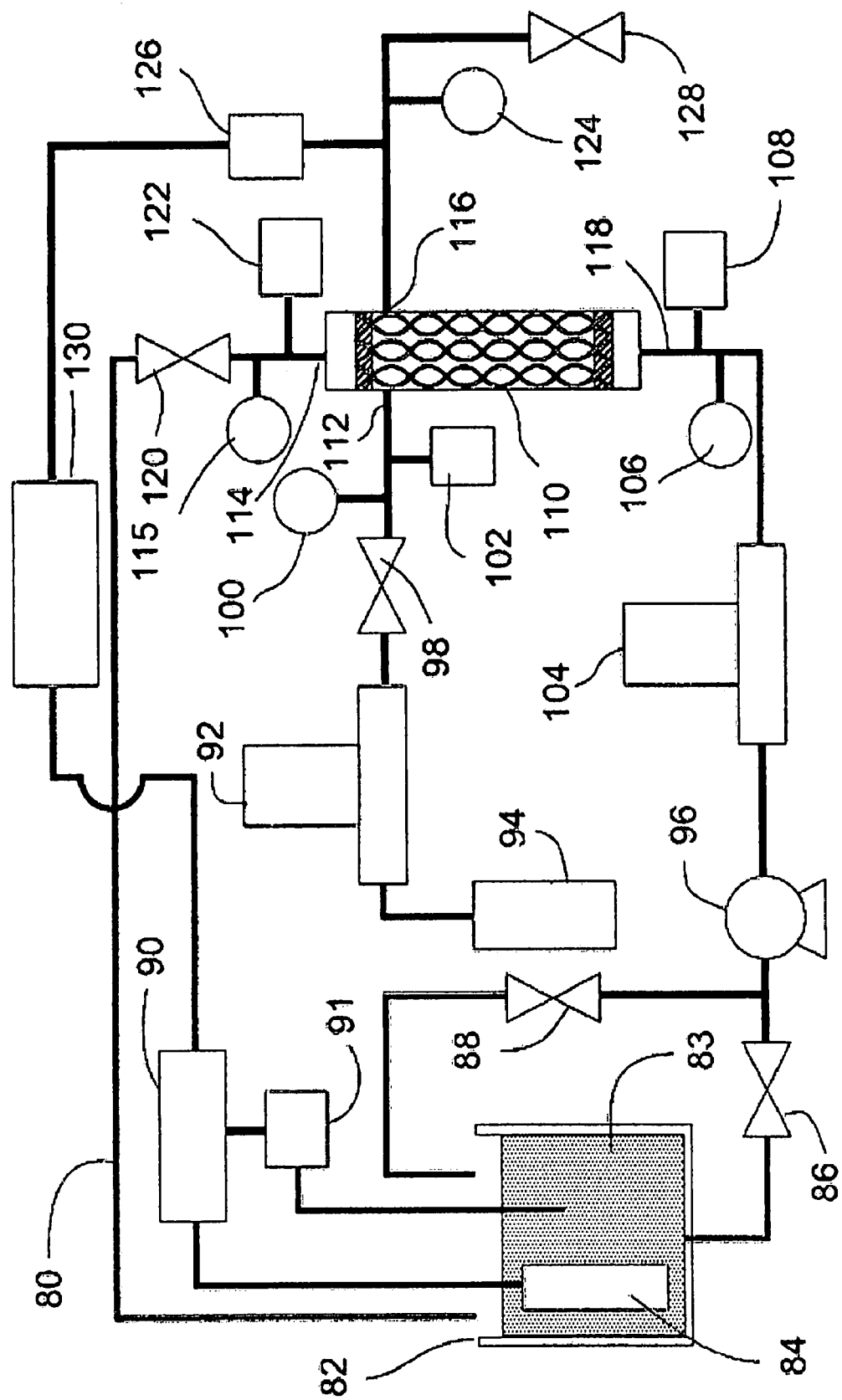
FIG. 2. is a schematic view illustrating the apparatus comprising a heat exchanger connected in-line with a fluid flow circuit, temperature control bath, and temperature control system of this invention to provide measured volumes of temperature controlled liquid at a dispense point.

An embodiment of this invention used to control the temperature and volume of a process liquid which is dispensed is shown schematically in FIG. 2. In this figure the flow of process fluid and working fluid are shown flowing in a co-current fashion, however the fluids may also be made to flow in a counter current fashion. The heat exchange apparatus 110 comprises a flow sensor 92 and a valve 128 to measure and control the volume of thermally conditioned process fluid which is dispensed. The process fluid from a source 94 is heated or cooled by the working or exchange fluid 84. A suitable liquid flow sensor 92 is available from NT International, Chaska, Minn. Fluid source 94 can be delivered to the heat exchanger by a pressurized pot or a pressurized NOW PAK@. Alternatively a pump, such as Intelligent, Mykrolis Corporation, Bedford, Mass., or White Knight pump, Hemlock, Mich. can be used to transport fluid from the source to the exchanger. The pump may be installed prior to exchanger fluid connection 112, or after fluid exchanger connection 116. The temperature of the heated liquid is monitored by temperature sensor 126 connected to a microprocessor-based temperature controller 130. An optional pressure transducer 124 may be installed at the exchanger outlet 116. The liquid is dispensed through valve 128 and onto a substrate. The valve 128 can be an on-off valve or a stop suck-back valve. Suitable stop-suck back valves are available from CKD Corporation, Japan. The controller 130 is in communication with a heater or chiller 90 used to maintain reservoir 82 at a temperature suitable for the application. The temperature of the liquid 83 in the reservoir 82 is conditioned by heater or cooling surface 84, and is measured with temperature sensor 91. This fluid is delivered to the exchange apparatus through valve 86, pump 96, and optional flow controller 104. After optional pressure transducer 106 and temperature sensor 108, the fluid from 82 enters the exchange apparatus at fluid connection 118. Energy is exchanged between the working and process fluids in the exchanger and fluid from 82 exits the exchanger a fluid connection 114. Fluid flows through the conduit with optional temperature sensor 122, pressure transducer 115 and returns to 82.

Figure 3:
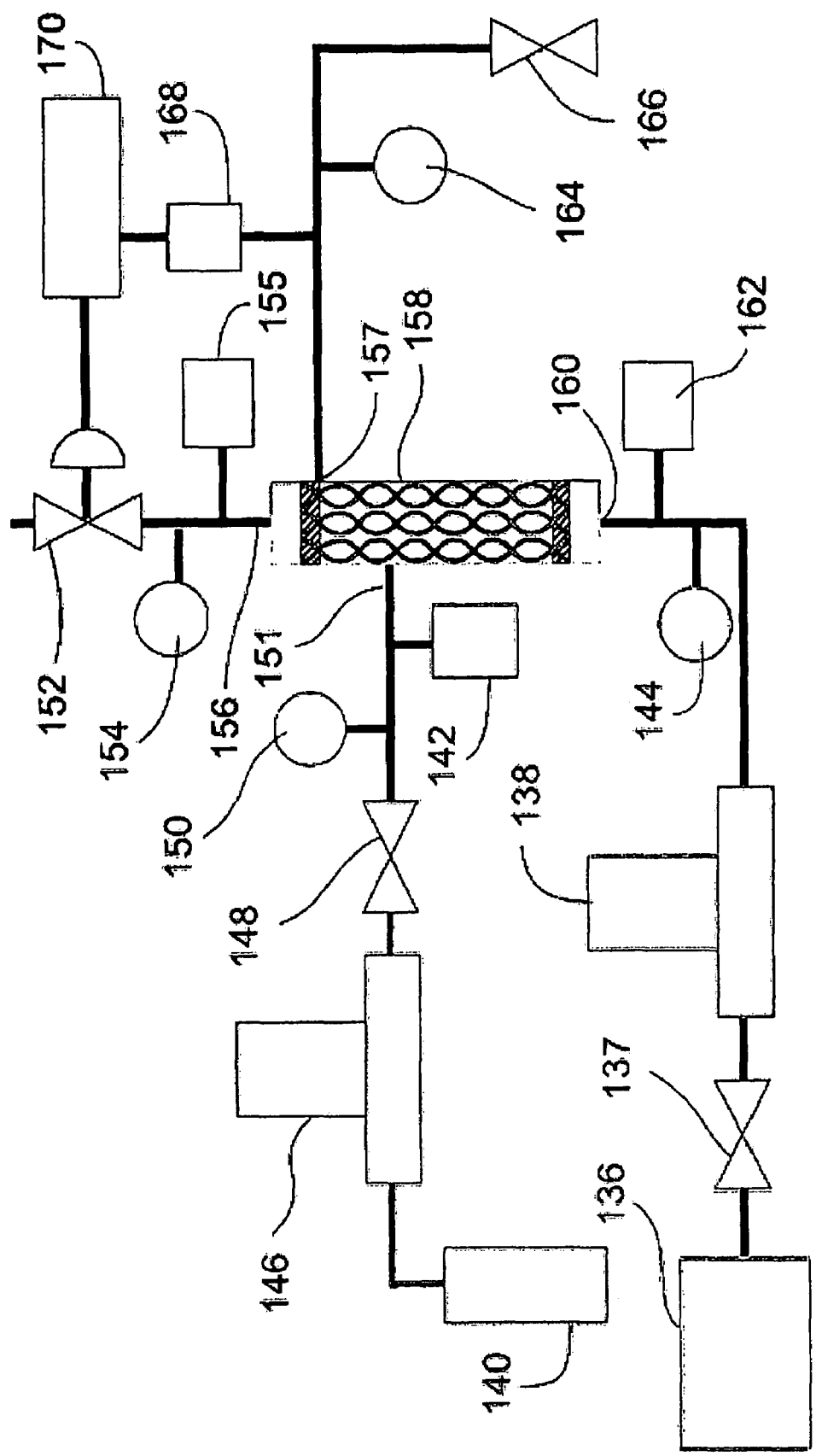
FIG. 3. is a schematic view illustrating the apparatus comprising a heat exchanger connected in-line with a fluid flow circuit, temperature control system and source of heated water or steam to provide controlled volumes of heated liquid at a dispense point.

FIG. 3 shows a schematic illustration of another configuration of the apparatus of this invention. A source of working or exchange fluid 136 other than from a closed loop supply or reservoir is used. In this figure the flow of process fluid from a source 140 and working fluid from a source 136 are shown flowing in a co-current fashion, however the fluids may also be made to flow in a counter current fashion. Examples of suitable working or exchange fluids 136 include chilled plant water, hot deionized water, a chilled fluid, a heated fluid, or steam source. These fluids are commonly available from the facilities of the semiconductor facility. Fluid from the source 136 flows through optional valve 137, optional flow controller 138, inlet 160 and optional pressure and temperature transducers 144 and 162. The fluid from 136 through inlet 160 enters the exchange apparatus 158 where energy is transfer with process fluid from source 140. Working fluid 136 exits the exchange apparatus through outlet 156 and through optional pressure and temperature transducers 154 and 155 respectively. Working fluid from a source 140 enters the exchange apparatus through a flow controller 146. Fluid from source 140 can optionally be delivered to the heat exchanger by a pressurized pot or a pressurized NOW PAK. Alternatively a pump, such as Intelligent, Mykrolis Corporation, Bedford, Mass., or White Knight pump, Hemlock, Mich. can be used to transport fluid from the source to the exchanger. The pump may be installed prior to exchanger fluid connection 151, or after fluid exchanger connection 157. Fluid from the source 140 flows through the conduit and optional valve 148, optional pressure transducer 150 and temperature sensor 142. Process fluid flows through the exchanger 158 where it exchanges energy with the working fluid from 136. A temperature sensor 168 measures the temperature of the output fluid 140 exiting the heat exchanger at fluid connection 157. Temperature sensor 168 is in communication with microprocessor controller 170 which opens and closes valve 152 to regulate the flow rate of working fluid through the exchange device; this controls temperature of the process fluid 140 exiting the heat exchanger. The liquid process fluid 140 is dispensed through valve 166 and onto a substrate. The valve 166 can be an on-off valve or a stop suck-back valve.

Figure 4:
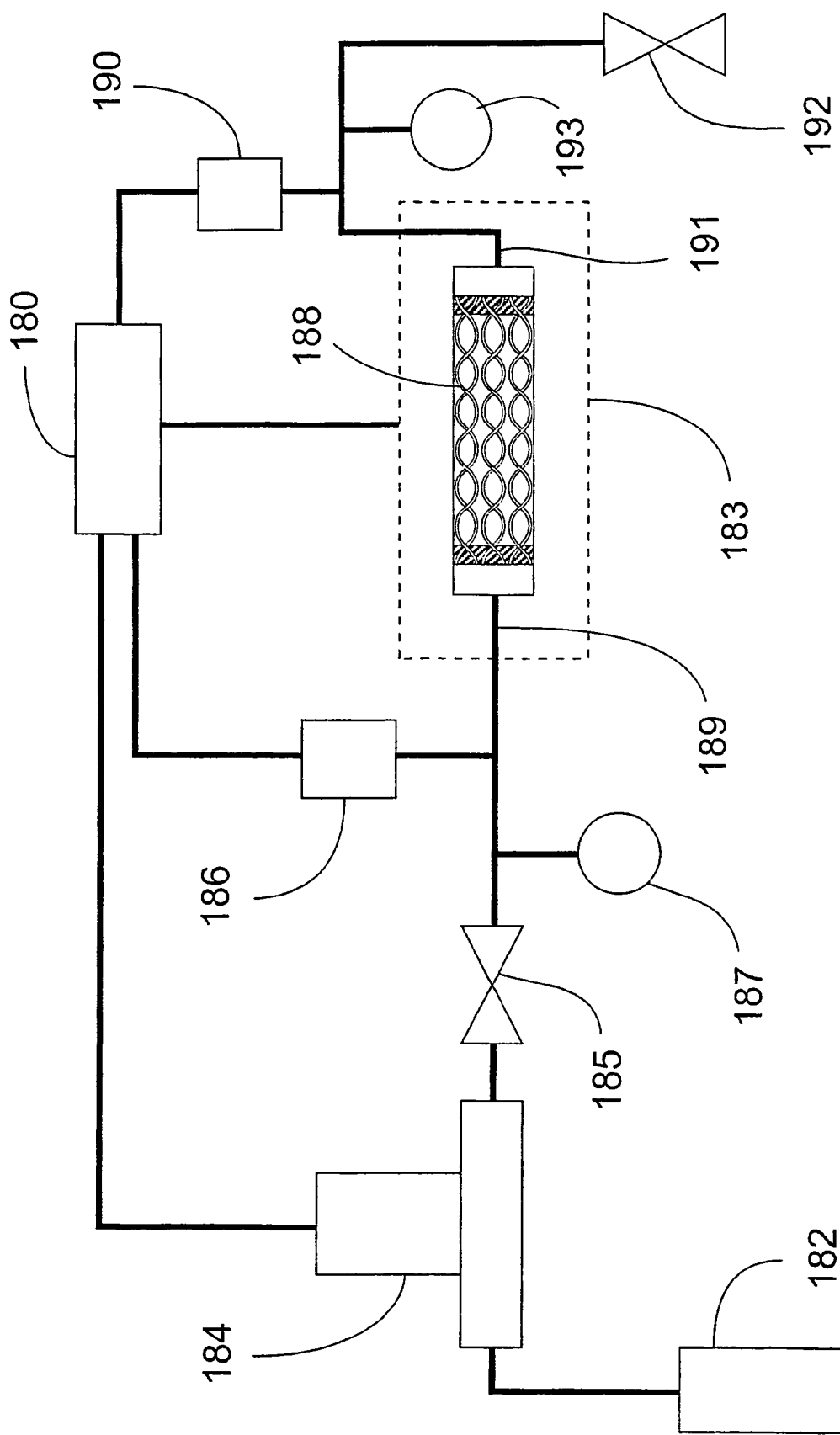
FIG. 4. is a schematic view illustrating the apparatus comprising a heat exchanger connected in-line with a fluid flow circuit, temperature control system and microwave energy source to provide controlled volumes of heated liquid at a dispense nozzle.

FIG. 4 illustrates another embodiment of this invention for heating a process liquid for dispense which utilizes a source of microwave energy 183 which encloses the hollow tubes. Perfluorinated thermoplastic pipe, tubes and fibers are transparent to microwaves and are ideal for flow through heating of aqueous or other microwave absorbing liquids like alcohols. Working fluid from a source 182 enters the exchange apparatus through a flow controller 184. Fluid from source 182 can optionally be delivered to the heat exchanger 188 by a pressurized pot or a pressurized NOW PAK®. Alternatively a pump, such as Intelligen®, Mykrolis Corporation, Bedford, Mass., or White Knight pump, Hemlock, Mich. can be used to transport fluid from the source to the exchanger. The pump may be installed prior to exchanger fluid connection 189, or after fluid exchanger connection 191. Fluid from the source 182 flows through the conduit and optional valve 185, optional pressure transducer is 187 and temperature sensor 186. Process fluid flows through the hollow tubes in the exchange apparatus and absorb microwave energy from the microwave system and source 183 enclosing the hollow tubes. A temperature sensor 190 measures the temperature of the output fluid 182 exiting the heat exchanger at fluid connection 191. Temperature sensor 190 is in communication with microprocessor controller 180 which turns the microwave magnetron on or off; this controls temperature of the process fluid 182 exiting the exchanger 188. Alternately the microprocessor controller 180 adjusts the power to the magnetron to control the temperature of the fluid by controlling the amount of microwave power generated. The liquid process fluid 182 is dispensed through valve 192 and onto a substrate. The valve 192 can be an on-off valve or a stop suck-back valve. Alternately, controller 180, in communication with temperature sensors 186 and 190, can be used to control flow meter 184 and regulate the flow and temperature of liquid.

Figure 5:
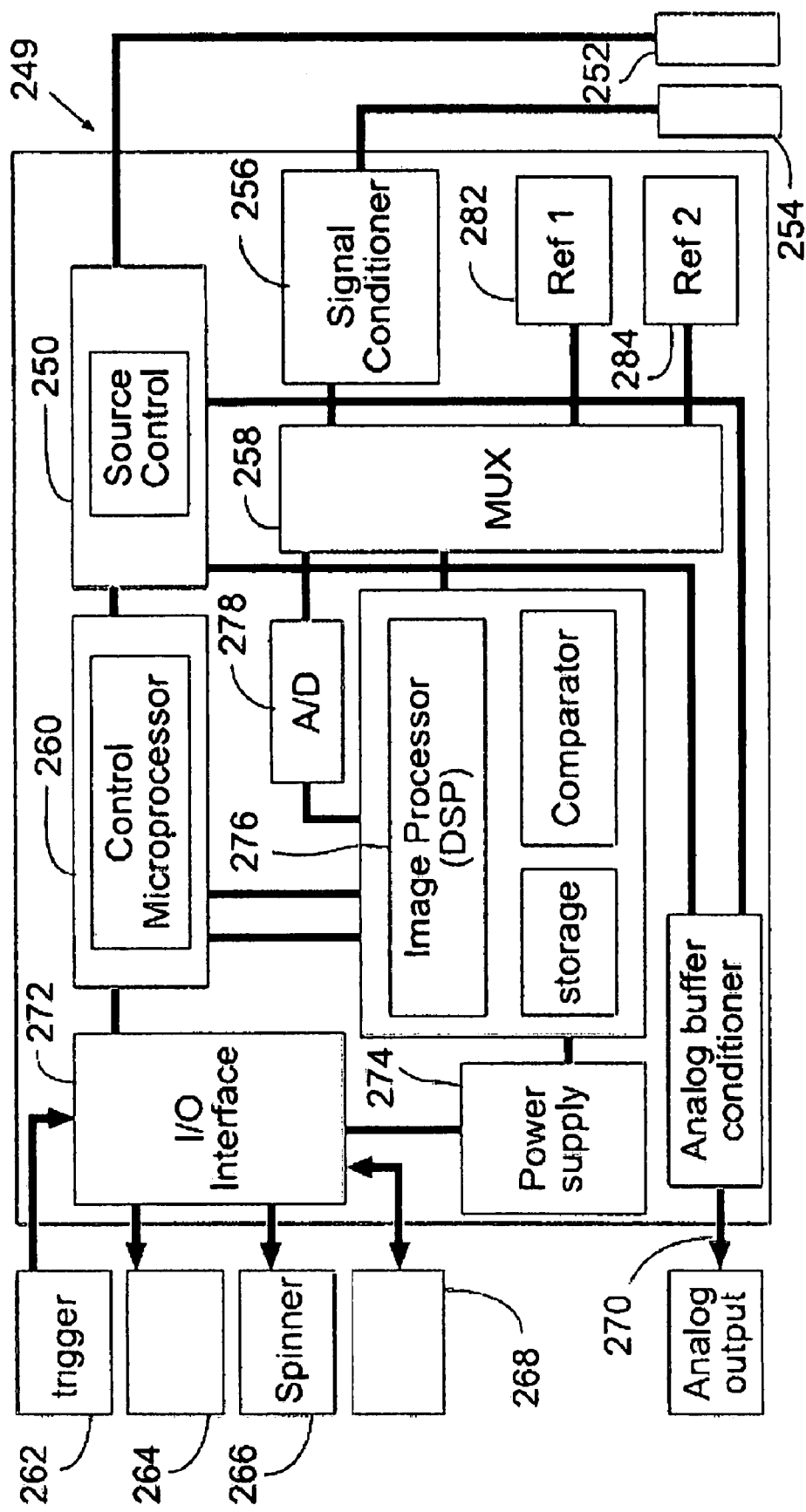
FIG. 5. is a schematic diagram illustrating a microprocessor circuit useful in controlling the temperature of the process fluid using the heat exchanger, valves and temperature sensors of this invention.

FIG. 5 illustrates a schematic diagram of a processor 249 capable of detecting the signals from one or more temperature sensors, processing the sensor signals into a suitable form, comparing the sensors measured temperature to a predetermined temperature setpoint, generating an electrical signal proportional to the difference between the measured fluid temperature and the setpoint temperature, and signaling dispense pumps, valves, flow meters, or process equipment to become activated based on the results of the comparison. The source control 250, by communication with the control microprocessor 260, controls at least one generated electrical signal proportional to the temperature difference between the measured fluid temperature and the fluid setpoint temperature. An electrical signal proportional to the rate of change of the fluid temperature can also be determined by the processor 249. This electrical signal may be output as voltage or current at connector 252 and is useful for controlling a fluid control valve or a fluid flow controller. Optionally the generated electrical signal at connector 252 modulates power to a microwave generator 183 or other energy source surrounding the hollow tubes. This electrical signal may also be used to control the temperature of the working or exchange fluid by modulating external heaters 90 shown in FIG. 2 or chiller 78 shown in FIG. 1. This arrangement can be used to compensate for different fluid characteristics and for changing dispense requirements. The signal conditioner 256 excites and accepts one or more sensor inputs 254. The signal conditioner 256 may amplify, filter, or average raw sensor output signal. Examples of sensors useful in the present invention include temperature, flow, pressure, and pH. The multiplexer 258 allows for multiple input reference voltages 282 and 284, which differ from the desired sensor signals, to effect calibration or control functions of the processor 249. The reference voltages 282 and 284 can be used for calibration and run time compensation for environmental changes such as temperature of fluid viscosity. The control processor 260 controls all input and output interfaces between the processor 249 and apparatus connected to the processor 249, including the trigger 262 which functions to start to record and analyze functions a multiple or single input; acknowledgment 264 which functions as signal support to equipment of a problem or task complete as a multiple or single outputs; spinner 266 which functions to spin a wafer; and analog output 270 which functions to indicate to the wafer spin control that the dispense is complete and the high speed spin can begin. The input-output interface 272 allows for a hardware connection to the track or other support equipment for communications via RS232, Device Net, RS485, or other digital protocol port 268. The port 268 is useful for start and stop control, enabling special equipment features, and determining system status. The power supply 274 converts incoming voltage to the internal required voltage such as 5 VDC for the processor and associated logic and analog supply voltage such as 15 VDC. The signal processor 276 obtains real time signal from the analog to digital converter 278 and runs algorithms required for the determination of fluid dispense temperature and flow rate. The data from the analog to digital converter 278 can be sorted for future retrieval and analysis. The real time data signal from the sensor can be used as the control signal for closed loop control of the volume, timing, and fluid temperature of a dispense.

In one embodiment a commercially available thermoplastic heat exchanger available from Ametek, Wilmington, Del., can be used. Other methods for forming thermoplastic heat exchangers useful in the practice of this invention are described in U.S. Pat. No. 3,315,750, U.S. Pat. No. 3,616,022, U.S. Pat. No. 4,749,031, U.S. Pat. No. 4,484,624, and Canadian paten No. 1,252,082 each of which is included by reference in their entirety. The hollow filaments can also be joined to the housing by the injection molding method described in European Patent Application 0 559 149 A1 included herein by reference in its entirety.

Figure 6:
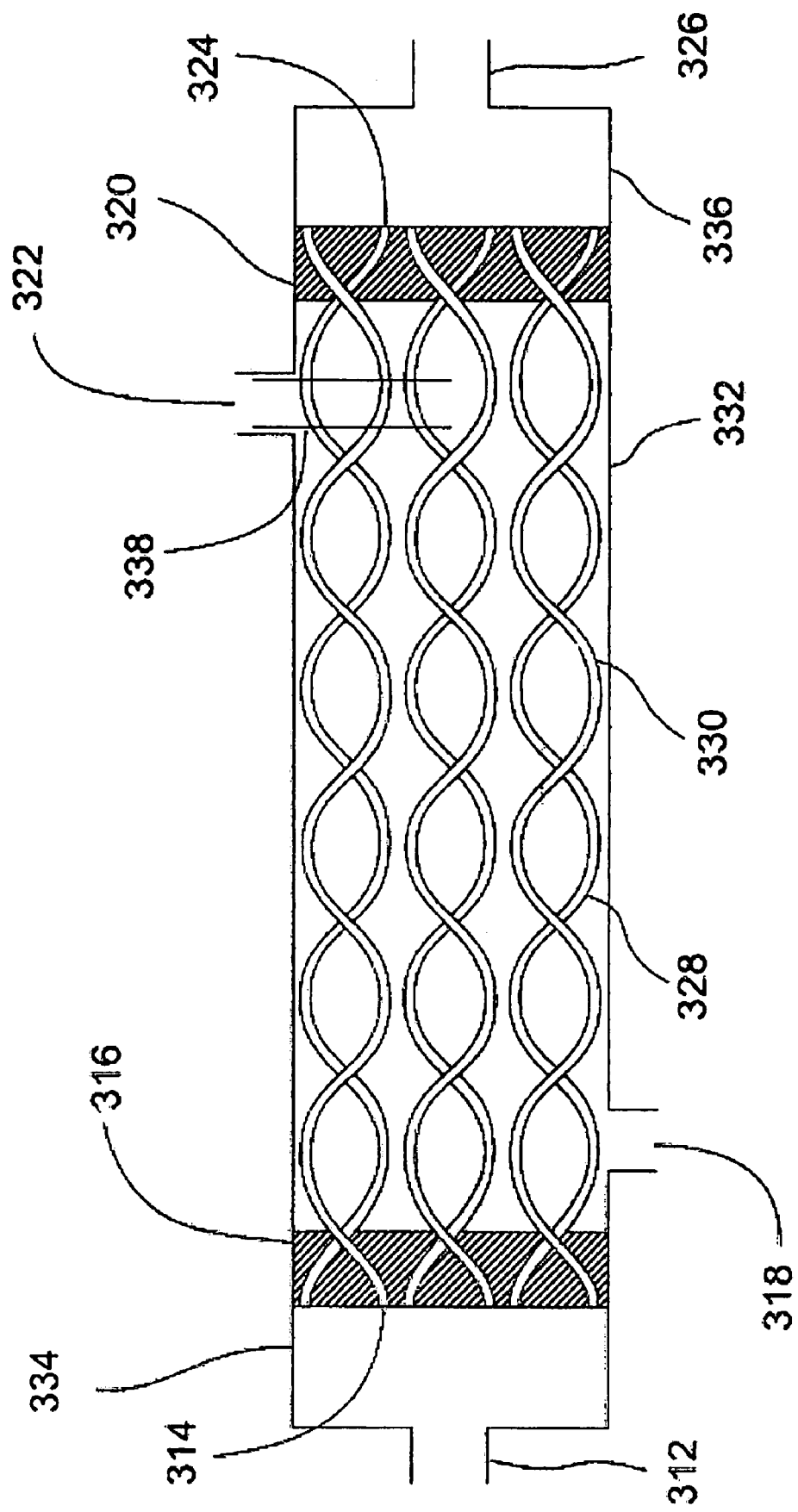
FIG. 6. is a schematic view illustrating a heat exchanger used in a preferred practice of this invention.

In a preferred embodiment, incorporated in its entirety by reference, Co-pending application filed concurrently herewith as U.S. Ser. No. 200100292PCT under Applicants reference number MYKP-620, International Patent Application Publication WO 03/029744, is used in the practice of this invention. The heat exchanger comprises matted, braided, plaited, or twisted perfluorinated thermoplastic hollow tubes which have been thermally annealed to set the bends or crests of the hollow tubes in the plait. An example of such a device is shown schematically in FIG. 6. The apparatus has high heat transfer surface area of about 13 square feet in a small volume of about 1 liter and the thermally annealed plaited tubes eliminates the need for baffling. Perfluorinated thermoplastic hollow tubes are preferred in the practice of this invention because of their chemical resistance and thermal stability. In this embodiment, the heat exchanger apparatus is formed in a unitary end structure or unified terminal end block structure with hollow tubes 328 and 330 fused to a thermoplastic resin at 316 and 320 as shown in FIG. 6. Hollow tubes 328 and 330, which can also be referred to in the practice of this invention as hollow fibers or hollow filaments, have been twisted and thermally annealed to set the bend of the tubes. The housing comprises a first fluid inlet fitting 312 and first fluid outlet fitting 326 on end caps 334 and 336. The end caps are optionally fusion bonded to the housing 332 and unified terminal end blocks 316 and 320. The housing also comprises a shell side inlet fitting 322, with optional insert 338 for shell side fluid flow distribution and shell side outlet fitting 318 for shell side fluid outlet. By way of illustration, a first liquid enters fluid fitting 312 and enters hollow tubes at 314 where it contacts a surface of the tubes and flows through the tubes to hollow tube outlet 324 and exits first fluid outlet fitting 326. A second fluid enters fluid connection 322 where it contacts a second surface of the tubes and flows across the tubes to outlet connection 318. The first and second fluids exchange energy through the walls of the hollow tubes. The first and second fluids are separated from each other by the housing 332 and unified terminal end blocks 316 and 320. The exchange apparatus adapted to be connected in-line with a fluid flow circuit comprises a housing provided with fluid fittings; an exchange core located within the housing, said exchanger core containing a plurality of non-circumferential tubes fabricated from a thermoplastic resin. Said tubes arranged in a lengthwise direction and having two end portions being fusion bonded at their periphery through a thermoplastic resin to form unified terminal end blocks in which the end portions of the non-circumferential tubes are fluid tightly bonded in a fused fashion yet allow fluid communication therethrough. The housing having a first fluid inlet to supply a first fluid to said first end of the exchange core to be contacted with a second fluid and a first fluid outlet connection to remove said contacted first fluid from said non-circumferential tubes and said housing having a first fluid inlet connection to supply a second fluid to be contacted with said first fluid to said volume formed between the inner wall of the housing and the non-circumferential tubes and a second outlet connection to remove said contacted second fluid.

Examples of perfluorinated thermoplastics or their blends which are useful in the practice of this invention for the hollow tubes and housing include but are not limited to [Polytetrafluoroethylene-co-perfluoromethylvinylether], (MFA), [Polytetrafluoroethylene-co-perfluoropropylvinylether], (PFA), [Polytetrafluoroethylene-co-hexafluoropropylene], (FEP), and [polyvinylidene fluoride], (PVDF). Both PFA Teflon® and FEP Teflon® thermoplastics are manufactured by DuPont, Wilmington, Del. Neoflon® PFA is a polymer available from Daikin Industries. MFA Haflon® is a polymer available from Ausimont USA Inc. Thorofare, N.J. Preformed MFA Haflon® and FEP Teflon® tubes are available from Zeus Industrial Products Inc. Orangebury, S.C. Other thermoplastics or their blends which are useful in the practice of this invention include but not limited to poly(chlorotrifluoroethylene vinylidene fluoride), polyvinylchloride, polyolefins like polypropylene, polyethylene, polymethylpentene, and ultra high molecular weight polyethylene, polyamides, polysulfones, polyetheretherketones, and polycarbonates.

Hollow thermoplastic tubes can be impregnated with thermally conductive powders or fibers to increase their thermal conductance. Examples of useful thermally conductive materials include but are not limited to glass fibers, metal nitride fibers, silicon and metal carbide fibers, or graphite.

Perfluorinated thermoplastic tube filaments made from blends of perfluorinated thermoplastics with outside diameters ranging from 0.007 to 0.5 inches, and more preferably 0.025 to 0.1 inches in diameter, and wall thickness ranging from 0.001 to 0.1 inches, preferably 0.003 to 0.05 inches in thickness, are useful for forming braided or twisted cord for the exchanger. For purposes of this invention, a single, un-wrapped annealed tube is considered a non-circumferential tube. Non-circumferential tubes are tubes with external dimensions that are not continuously circumferential on a longitudinal axis moving from one end portion of the tube to the other. Examples include, but are not limited to, a helical coil, a permanently twisted hollow circular tubing such as the single, un-wrapped annealed fiber or a tube that is extruded in such condition, a triangular shaped tube or fiber, a rectangular shaped tube or fiber, or a square shaped tube or fiber. The annealed twisted hollow tube cords are inserted into a poly(tetrafluoroethylene-co-perfluoro(alkyvinylether)), Teflon®. PFA, or MFA shell tube. The shell tube optionally has fluid fittings fusion bonded to its surface to form an inlet and an outlet ports. The packing density of the tube cords within the shell tube should be in the range of from 3-99 percent by volume, and more preferably 20-60 percent by volume. Potting and bonding of the tube cords into the housing can be done in a single step. The preferred thermoplastic resin potting material is Hyflon MFA 940 AX resin, available from Ausimont USA Inc. Thorofare, N.J. The method comprises vertically placing a portion of a bundle of the annealed and twisted hollow tube cord lengths with at least one closed end into a temporary recess made in a pool of molten thermoplastic polymer held in a container. The hollow tubes are held in a defined vertical position, maintaining the thermoplastic polymer in a molten state so that it flows into the temporary recess, around the hollow tubes and vertical up the fibers, completely filling the interstitial spaces between fibers with the thermoplastic polymer. A temporary recess is a recess that remains as a recess in the molten potting material for a time sufficient to position and fix the bundle of hollow tubes in place and then will be filled by the molten thermoplastic. The temporary nature of the recess can be controlled by the temperature at which the potting material is held, the temperature at which the potting material is held during hollow tube bundle placement, and the physical properties of the potting material. The end of the hollow tube can be closed by sealing, plugging, or in a preferred embodiment, by being formed in a loop.

The braid, plait, twist, or non-circumfrential geometry of the hollow tubes or fibers provides for enhanced fluid distribution across and within the hollow tubes. The device provides high fluid contacting area in a small volume without the need for baffles. The unitary or unified terminal block construction of the apparatus with chemically inert materials of construction eliminates the need for o-rings and permits use of operation of the device at elevated temperatures and with a variety of fluids.

EXAMPLE 1

Preformed MFA tube filaments with 0.047 inch inside diameter and 0.006 inch thick wall thickness were from Zeus Industrial Products Inc. Orangebury, S.C. Cord for potting were made by twisting the MFA filaments to obtain 12 turns per foot of strand. A single strand was wrapped around a metal frame 8 inches wide and 18 inched long. The frame and wrapped strand were annealed in an oven for 30 minutes at 150 degrees Celsius. About 75 cords measuring 18 inches in length were obtained from the rack aster annealing. Cord from multiple racks are gathered to yield 310 cords and placed into a previously heat treated and MFA coated PFA tube measuring 16 inches in length. The inside diameter of the PFA was 2 inches and fluid fittings were bonded 2 inches from each end of the PFA tube. Each end of the device was potted using Hyflon® MFA 940 AX resin, obtained from Ausimont USA Inc. Thorofare, N.J., for about 40 hours at 275° C. Cool down of each end after 40 hours of potting was controlled to a rate of 0.2° C. per minute to 150° C. to prevent stress cracking. The ends were cleared of resin and the filaments opened by machining the end portion of the potted device using a lathe. Fluid fittings for the potted exchanger were made by scoring a pipe thread onto each end of the tube.

Figure 7:
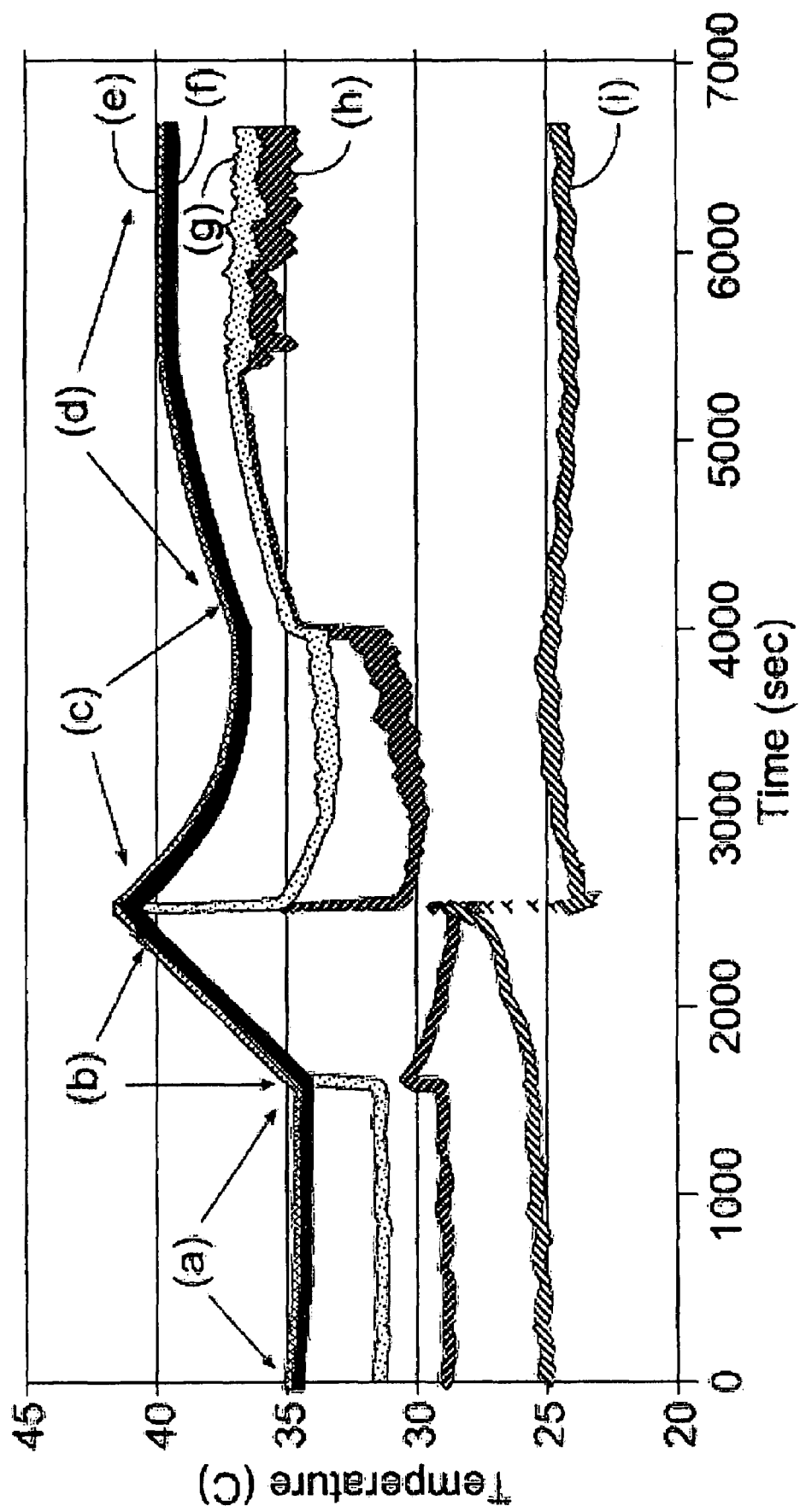
FIG. 7. is a graphical representation of a closed loop method of use of the apparatus of this invention described in Example 1.

Test setup shown in FIG. 1 consisted of fluid flow through pump 26 of 7.2 liters per minute (tube flow) and exchange fluid flow of 6.2 liters (shell flow) per minute at about 25° C. Two 1000 watt heaters were placed in the 45 liter volume bath 12. With 6.2 liters per minute 25° C. water flow through fittings 52 and 54 the temperature of the bath was maintained at about 34° C. (a). When cool water flow was stopped, the temperature of the bath 12 increased to 41° C. (b). Use of an Omega Engineering controller model number CN76000 with a resistive temperature sensor, 22, in the bath enabled control of the bath temperature to setpoint 1 of 38° C. (c) and set point two of 39.5° C. (d). The controller was connected to a pneumatic valve 64 via an electrically actuated solenoid valve, not shown, pressurized to 80 pounds per square inch. The controller opened and closed the valve in response to the electrical signal from the controller. The results from this example are shown in FIG. 7 where tube inlet temperature (e), bath temperature (f), tube outlet temperature (g), shell outlet temperature (h), and shell inlet temperature (i) have been labeled.

EXAMPLE 2

Preformed MFA tube filaments with 0.047 inch inside diameter and 0.006 inch thick wall thickness were from Zeus Industrial Products Inc. Orangebury, S.C. Cord for potting were made by twisting the MFA filaments to obtain 12 turns per foot of strand. A single strand was wrapped around a metal frame 8 inches wide and 18 inches long. The frame and wrapped strand were annealed in an oven for 30 minutes at 150 degrees Celsius. About 75 cord measuring 18 inches in length were obtained from the rack after annealing. Cord from multiple racks are gathered to yield 310 cords. They were placed into a previously heat treated and MFA coated PFA tube measuring 16 inches in length. The inside diameter of the tubes was 2 inches and fluid fittings were bonded 2 inches from each end of the PFA tube. Each end of the device was potted using Hyflon® MFA 940 AX resin, obtained from Ausimont USA Inc. Thorofare, N.J., for about 40 hours at 275° C. Cool down of each end after 40 hours of potting was controlled to a rate of 0.2° C. per minute to 150° C. to prevent stress cracking. The ends were cleared of resin and the filaments opened by machining the end portion of the potted device using a lathe. Fluid fittings for the potted exchanger were made by scoring a pipe thread onto each end of the tube. Two devices were configured in series with the outlet of fluid from the tubes of a first heat exchanger feeding the inlet fitting to the tubes of the second heat exchanger.

Figure 8:
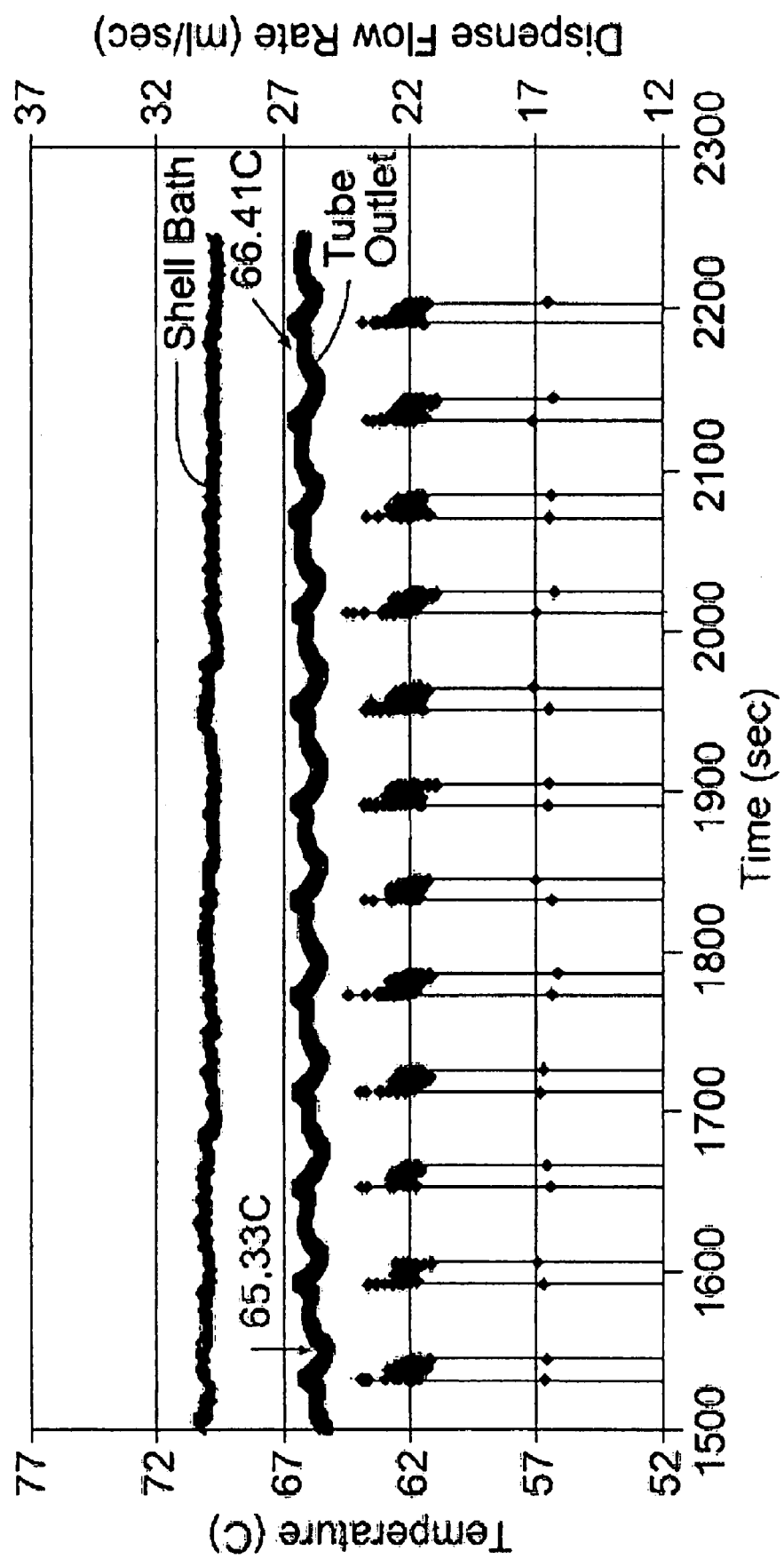
FIG. 8. is a graphical representation of a dispense method of use of the apparatus of this invention described in Example 2.

The test setup is illustrated in FIG. 2. Flow meter 92 from NT International, and electrical valve 98 from Entegris were connected to heat exchanger 110 upstream of the fluid fitting 112. Heated exchange fluid contained in reservoir 82 was prepared by heating a 60 liter reservoir of water with three 1000 watt heaters to a temperature of 70° C. Process liquid water, tube (cold) flow of 1380 ml/min, at a temperature of 23° C., 94, was fed into the heat exchanger for contact and exchange of energy with the 70° C. working fluid, shell (hot) flow of 900 ml/min, through the walls of the hollow tubes. A dispense consisted of about 330 milliliter volume of water delivered at a flow rate of about 22 milliliters per second for 15 seconds. One dispense was made every minute. The process water was dispensed by opening and closing valve 98. The results from this test are shown graphically in FIG. 8. The results show the apparatus of this invention can heat volumes of liquid from 23° C. to about 65.7° C. in a repeatable manner.

The invention claimed is:

1. An apparatus for conditioning the temperature of a first fluid, said apparatus adapted to be connected in-line with a first fluid flow circuit, said apparatus comprising:
   a plurality of thermoplastic hollow tubes, each of said hollow tubes having a first surface, a second surface, and a wall having a thickness from 0.001 inches to 0.1 inches between said first surface and said second surface, said hollow tubes having two end portions and hollows passing therebetween;
   end portions of said hollow tubes fluid tightly bonded together in a fused fashion with a thermoplastic resin to an end of a housing to form a unified terminal end block; said hollow tubes being un-bonded at portions other than the end portions; said unified terminal end block having through hole communication with the hollows of unbonded portions of said hollow tubes, said hollow tubes have a packing density of from 3 to 99 percent by volume in said housing;
   said housing having a first fluid inlet whereby the first fluid contacts the first surface of the hollow tubes, said first fluid flows to a first fluid outlet; said housing including a second fluid inlet whereby a second fluid contacts the second surface of the hollow tubes, said second fluid flows to a second fluid outlet; said first fluid and said second fluid exchange energy through the walls of the hollow tubes, the first fluid and the second fluid separated by the housing, the walls of the hollow tubes, and said unified terminal end block;
   means for controlling a flow of the second fluid, said means for controlling the flow of the second fluid being in fluid communication with said second fluid outlet of said housing;
   a temperature sensor in fluid communication with said first fluid outlet, said temperature sensor measuring a temperature of the first fluid; and
   a controller; said controller determining the temperature of the first fluid, said controller comparing said measured temperature of the first fluid to a setpoint temperature for said first fluid, said controller generating an electrical output signal proportional to a difference between the first fluid setpoint temperature and the temperature of the first fluid.

2. The apparatus of claim 1 wherein the generated electrical output signal proportional to the difference between the first fluid setpoint temperature and the measured temperature of the first fluid changes the flow of the second fluid through said means for controlling a flow of the second fluid until the temperature of the first fluid is substantially equal to the first fluid setpoint temperature.

3. The apparatus of claim 2 further comprising: a valve that controls of the dispense of a volume of said first fluid.

4. The apparatus of claim 2 wherein the flow controlling means for the second fluid is in fluid communication with said second fluid inlet.

5. The apparatus of claim 4 wherein the flow controlling means for the first fluid is a dispense pump, valve, fluid flow controller, or pressure pot.

6. The apparatus of claim 1 further comprising: means for conditioning a temperature of the second fluid until the temperature of the first fluid is substantially equal to the first fluid setpoint temperature.

7. The apparatus of claim 1 further comprising: an energy source surrounding the hollow tubes the generated electrical output signal modulates power to the energy source surrounding the hollow tubes until the temperature of the first fluid is substantially equal to the first fluid setpoint temperature.

8. The apparatus of claim 1 further comprising: means for delivering said first fluid to said first fluid inlet.

9. The apparatus of claim 1, wherein said thermoplastic hollow tubes, said housing, or said thermoplasic resin is comprised of poly(tetrafluoroethylene-co-perfluoro(alkyvinylether)), poly(tetrafluoroethylene-co-hexafluoropropylene), polytetrafluoroethylene-co-perfluoromethylvinylether, or co-polymers thereof.

10. The apparatus of claim 1, wherein said thermoplastic hollow tubes are non-circumfrential.

11. The apparatus of claim 1, wherein said thermoplastic hollow tubes are plaited into cords and thermally annealed.

12. The apparatus of claim 1 wherein said thermoplastic hollow tubes are impregnated with a thermally conductive material.

13. The apparatus of claim 1 wherein said first fluid is a photoresist, antireflective coating, or a photoresist developer.

14. The apparatus of claim 1 wherein said first fluid is a spin on dielectric.

15. The apparatus of claim 1 wherein said first fluid is a solution comprising copper ions.

16. The apparatus of claim 1 wherein said first fluid is chosen from the group consisting of acids, bases, oxidizers, or abrasive slurry.

17. The apparatus of claim 1 wherein said first fluid is a photoresist stripper.

18. The apparatus of claim 1 wherein said first fluid is an organic liquid.

19. The apparatus of claim 1 wherein the first fluid is water.

* * * * *